Dec. 23, 1958

J. RISNER 2,865,991

DYNAMIC CONTRAST EXPANDER

Filed Jan. 3, 1956

INVENTOR.
JOSEPH RISNER

BY Albert F. Kronman

ATTORNEY

United States Patent Office 2,865,991

Patented Dec. 23, 1958

2,865,991

DYNAMIC CONTRAST EXPANDER

Joseph Risner, Belmar, N. J., assignor to Trad Television Corporation, Asbury Park, N. J., a corporation of New Jersey Application January 3, 1956, Serial No. 556,963

5 Claims. (Cl. 178—7.5)

This invention relates to an adjustable contrast expander for television receivers which employ a cathode ray picture tube. It has particular reference to an independently adjustable circuit which controls the brightness and contrast of the received picture without altering the intensity of the black areas.

Several types of contrast control circuits have been designed and used. In its usual form the prior art circuits contained no amplifying tubes but used instead one or more rectifying elements to accomplish the result. Such circuits obviously consumed power and caused a certain amount of interaction with other amplifier and control circuits.

The present invention comprises a means for controlling the contrast of a television picture without altering the black areas. The invention includes an amplifying circuit having its input connected to a circuit which carries the video signal and its output connected to a second control grid in the electron gun of a cathode ray picture tube. The amplifying circuit extracts the white signal potential and amplifies this signal voltage variation.

One of the objects of this invention is to provide an improved control for television receivers which avoids one or more of the disadvantages and limitations of prior art arrangements.

Another object of the invention is to eliminate interaction between the contrast control circuit and other operating circuits in a television receiver such as the video amplifier and the high voltage supply circuit.

Another object of the invention is to eliminate "blooming" of the raster by operating the cathode ray tube in a manner similar to a shunt regulator across the anode power supply.

Another object of the invention is to raise the efficiency of the video amplifying circuit by providing an amplified contrast signal which may be applied to an electrode in the picture tube.

Another object of the invention is to make the contrast expander circuit independently adjustable without altering the black parts of the picture and without changing the supply voltages to other parts of the receiving circuit.

Another object of the invention is to provide a contrast control expander circuit which may be applied to a television transmitting circuit as well as to a receiver.

For a better understanding of the present invention, with other and further objects thereof, reference is made to the following description taken in connection with the accompanying drawings.

Figures 1, 2, 3, 5:
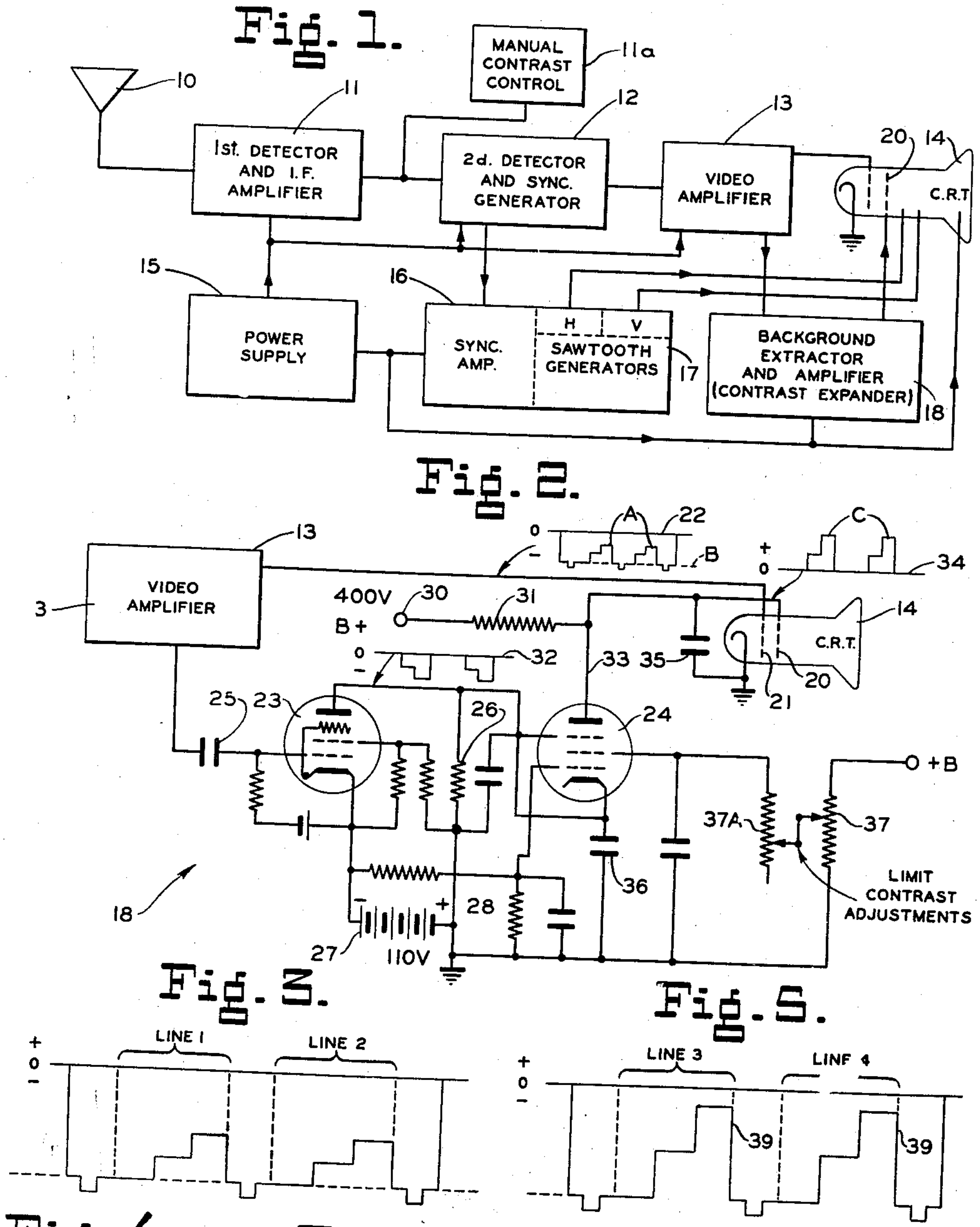
Fig. 1 is a schematic diagram of connections showing a complete television receiving set with all the circuits in block form.
Fig. 2 is a schematic diagram of connections showing the details of the contrast expander circuit.
Fig. 3 is a graph showing a video signal having a weak contrast.
Fig. 5 is a graph similar to Fig. 3 but indicating increased contrast.

Referring now to Fig. 1, the circuit includes an antenna, a first detector and intermediate frequency amplifier 11, a manual contrast control 11A, a second detector and synchronous signal generator 12, a video amplifier 13, and a cathode ray picture tube 14. The above components constitute the signal transmitting components of the usual television receiver. In addition to the above, the usual receiver employs a power supply, a synchronous signal amplifier, and sawtooth generators 17 which provide the horizontal and vertical deflection signals. The present invention comprises a background extractor and amplifier circuit 18 which acts in conjunction with a second grid 20 in the cathode ray tube 14. The contrast unit adjustments 37 and 37A (see Fig. 2) are connected to one of the stages in amplifier 24 and the amplifier's output is connected directly to grid 20.

Referring now to Fig. 2, the video amplifier 13 has its output connected to a first control grid 21 in the cathode ray tube 14. The amplifier 13 furnishes a positive-going signal applied to a basic negative composite signal and in addition includes the usual synchronizing and blanking signals which occur between each line. A two line example of the video signal is indicated by graph 22. The contrast expander circuit 18 is shown in detail and comprises two amplifier tubes, a pentode 23 and a pentode 24. The control grid of the pentode 23 is connected to an output of the video amplifier through a coupling circuit which includes a blocking capacitor 25. The anode circuit of pentode 23 is connected directly to the cathode of pentode 24 and is also connected to ground in series with a resistor 26. Operating potential for pentode 23 is obtained by connecting the cathode to a source of potential 27 which is approximately 110 volts below the ground potential. Pentode 24 has its control grid connected to ground potential through a resistor 28. The anode of pentode 24 is connected to a positive potential supply terminal 30 in series with a resistor 31 and to the second control grid 20 in cathode ray tube 14. The signals supplied to tube 23 are indicated by the graph 22 and comprise positive-going signals A above a negative voltage base B. When this type of signal is applied to pentode 23, capacitor 25 eliminates the zero potential base and the blanking and synchronizing pulses are eliminated because these voltages are less than the cut-off voltage of the first control grid. The positive-going video pulses appear in the anode circuit but with negative polarity as indicated in graph 32.

The anode of pentode 23 is direct coupled to pentode 24 and this tube amplifies the video signals and again reverses their polarity and the signal which is transmitted over anode conductor 33 to the second grid 20 comprises a positive-going series of signals as indicated by graph 34. It will be obvious that noise signals and atmospheric disturbances of very short duration may cause variations in brightness which are unwanted. Capacitors 35 and 36 have been inserted in the circuit to increase the time constant so that these signals will be absorbed and not cause too much brightness variation in the received picture. The brightness range is effected by varying the potential of the second grid in pentode 24. This is done by manually adjusting resistor units 37 and 37A which are high and low limit level controls, respectively. If resistor 37 is adjusted so as to lower the potential of the screen grid of tube 24, the anode potential will rise and the brightness will be increased.

Figures 4, 6:
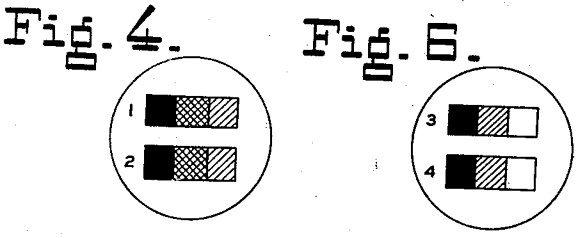
Fig. 4 is a view of a portion of the fluorescent screen of a cathode ray picture tube indicating the results of the video signals shown in Fig. 3.
Fig. 6 is a view similar to Fig. 4 but showing the results of the signal of Fig. 5.

From the above description it will be obvious that the intensity of the cathode ray beam is proportional to the combined effects of the voltages as indicated in graphs 22 and 34. Each of these graphs contain positive-going similar signals although they have different base voltages. The combined effect produces a result which would be the same as the application of a video signal 39 as shown in Fig. 5. The addition of the amplified positive signal voltage on second grid 20 is the synthesis of the signals of the two graphs shown in Figs. 3 and 5, the final effects of which are indicated by the square areas in Figs. 4 and 6. "Blooming," or the temporary enlarging of the screen picture, is prevented by the presence of the second control grid 20. When there is a tendency to "bloom" due to power overload, the potential of grid 20 is reduced and the white areas are reduced in brightness, thereby lowering the tube load and maintaining the correct picture size.

The above description indicates how the contrast of a received picture may be increased. The reverse is also true. If the picture is too contrasty and contains many black and white areas that produce an unpleasant effect, the contrast may be reduced by adjusting the resistor units 37 and 37A to a value which materially reduces the output voltage applied to control grid 20. This reduced potential in combination with the regular video signal, reduces the intensity of the white portions of the picture without interfering with the black portions and the result is a more pleasing picture possessing greater detail. It should be pointed out that the black areas are generally controlled by the manual contrast **11*a* while the brightness is controlled by resistors 37 and 37A**. Since there is no direct circuit connection between these two components, the adjustments are independent of each other.

Having thus fully described the invention, what is claimed as new and desired to be secured by Letters Patent of the United States is:

1. An adjustable contrast expander for television receivers comprising, a cathode ray picture tube including a first and second control grid, a video amplifier which amplifies and transmits video signals to the first control grid; said video signals including pulses proportional to picture light intensity values, blanking signals, and synchronizing signals; an amplifying circuit having an input conductor coupled between the control grid of the amplifier circuit and an output circuit of the video amplifier and an output connected to said second control grid for applying a positive output voltage thereto proportional to the picture light values; said amplifying circuit including a phase reversal means which produces positive video signals at the amplifying circuit output; and means for manually varying the positive output voltage of said amplifying circuit.

2. An adjustable contrast control for television receivers comprising; a cathode ray picture tube including a first and second control grid; a video amplifier which amplifies and transmits video signals to the first control grid; said video signals including pulses proportional to picture light values, blanking signals, and synchronizing signals; an amplifying circuit having an input conductor coupled between the control grid of the amplifier circuit and an output circuit of the video amplifier and an output connected to the second grid for applying a positive voltage thereto proportional to the picture light values; said amplifying circuit having means for eliminating said blanking and synchronizing signals and for transmitting said picture light pulses, said amplifying circuit also including a phase reversal means which produces positive video signals at the amplifying circuit output, and means for manually varying the positive output voltage of said amplifying circuit.

3. An adjustable contrast control for television receivers comprising; a cathode ray picture tube including an electron gun having a first and second control grid for controlling the intensity of a cathode ray beam; a video amplifier which amplifies and transmits video signals to said first control grid; said video signals including pulses proportional to picture light values, blanking signals, and synchronizing signals; an amplifying circuit having an input control grid coupled to an output of said video amplifier and an output connected to the second control grid for applying a positive voltage thereto proportional to the picture light values; said amplifying circuit having means for eliminating said blanking and synchronizing signals and for transmitting said picture light pulses; said amplifying circuit also including a phase reversal means which produces positive video signals at the amplifying circuit output; and means for manually varying the positive output voltage of said amplifying circuit.

4. An adjustable contrast expander for television receivers in accordance with claim 3 wherein the negative background voltage present in the video signals is eliminated by a biased limiter circuit contained in said amplifying circuit.

5. An adjustable contrast expander for television receivers in accordance with claim 4 wherein said video signals from the video amplifier are applied to said first control grid having a negative voltage bias greater than the video signal voltage.

References Cited in the file of this patent

UNITED STATES PATENTS 2,425,330 Kenyon ---------------- Aug. 12, 1947